United States Patent [19]

Panzer

[11] 4,382,266

[45] May 3, 1983

[54] BROAD BAND SWITCHING SYSTEM

[75] Inventor: Klaus Panzer, Munich, Fed. Rep. of Germany

[73] Assignee: Siemens Aktiengesellschaft, Berlin & Munich, Fed. Rep. of Germany

[21] Appl. No.: 204,209

[22] Filed: Nov. 5, 1980

[30] Foreign Application Priority Data

Dec. 20, 1979 [DE] Fed. Rep. of Germany ....... 2951512

[51] Int. Cl.$^3$ .......................... H04N 7/18; H04B 9/00
[52] U.S. Cl. ..................................... 358/86; 358/181; 455/615; 455/617
[58] Field of Search ................. 358/86, 181; 455/600, 455/615, 617, 612, 610; 370/4; 179/18 GF; 333/101; 340/166 R

[56] References Cited

U.S. PATENT DOCUMENTS

| | | | |
|---|---|---|---|
| 2,854,506 | 9/1958 | Pickles | 178/6 |
| 3,427,543 | 2/1969 | Ito | 325/7 |
| 3,980,831 | 9/1976 | Mertel | 179/2 R |
| 4,064,460 | 12/1977 | Gargini | 325/308 |
| 4,274,112 | 6/1981 | Leysieffer | 358/181 |

FOREIGN PATENT DOCUMENTS

| | | |
|---|---|---|
| 20878 | 1/1981 | European Pat. Off. . |
| 2510865 | 9/1975 | Fed. Rep. of Germany . |
| 2421002 | 11/1975 | Fed. Rep. of Germany . |
| 2828662 | 6/1979 | Fed. Rep. of Germany . |
| 2264447 | 10/1975 | France . |
| 2269829 | 11/1975 | France . |

OTHER PUBLICATIONS

W. Horak, "Analog TV Signal Transmission over Multimode Optical Waveguides", Siemens Forsch. v. Entwickl. Bd. 5, (1976), No. 4, pp. 194-202.
Coyne, J. J., "Integrated Broad Band ... Optical Fiber Transmission", ISSLS 78, Mar. 1978, IEEE Electronics Div.
Baack et al., "Analogue Optical Transmission of 26 T.V. Channels", Electronics Letters, May 10, 1979, vol. 15, No. 10, pp. 390-391.
Beakley, G. W., "Television to Small Earth Stations", IEEE Trans. on Broadcasting, vol. BC-22, No. 3. Sep. 1976, pp. 96-100.
Yoshida et al., "12 GHz 3 TV Receiver . . . Satellites", NEC Research and Development, No. 50, Jul. 1978, pp. 42-50.
Schuessler, H., "Service Integrated . . . Fiber Technology", Optical Communication Conf., Amsterdam, Sep. 1979, pp. V-1 . . . V-7.
Bauch, H., "Künftige Kommunicationstechnik mit Lichtleitern", NT2, vol. 32, (1979), No. 3, pp. 150-153.
Antennen Information, No. 63, Jun. 1979, (Siemens).
Pfannschmidt, H., "Arbeitsgeschwindigkeitsgrenzen von Koppelnetzwerken für Breitband-Digitalsignale", Dissertation, U. of Braunschweig, pp. 42-45, Mar. 16/Jun. 29, 1978.

*Primary Examiner*—Howard Britton
*Attorney, Agent, or Firm*—Hill, Van Santen, Steadman, Chiara & Simpson

[57] ABSTRACT

A broad band switching system for television signals and, under certain conditions, for radio signals, provides that the signals which are phase modulated with the TV programs are switchable by way of a broad band switching network and can then be transmitted in frequency division multiplex to the subscribers by way of light wave guides. In such a system, each television program source is supplied in a plurality of frequency channels to a corresponding plurality of frequency channel-specific switching levels for the purpose of television program switching, so that each subscriber has simultaneous access in the plurality of frequency channels to a corresponding plurality of programs. Additional television program sources, as well as audio program sources, can be constantly connected to the subscribers by way of additional frequency channels.

10 Claims, 4 Drawing Figures

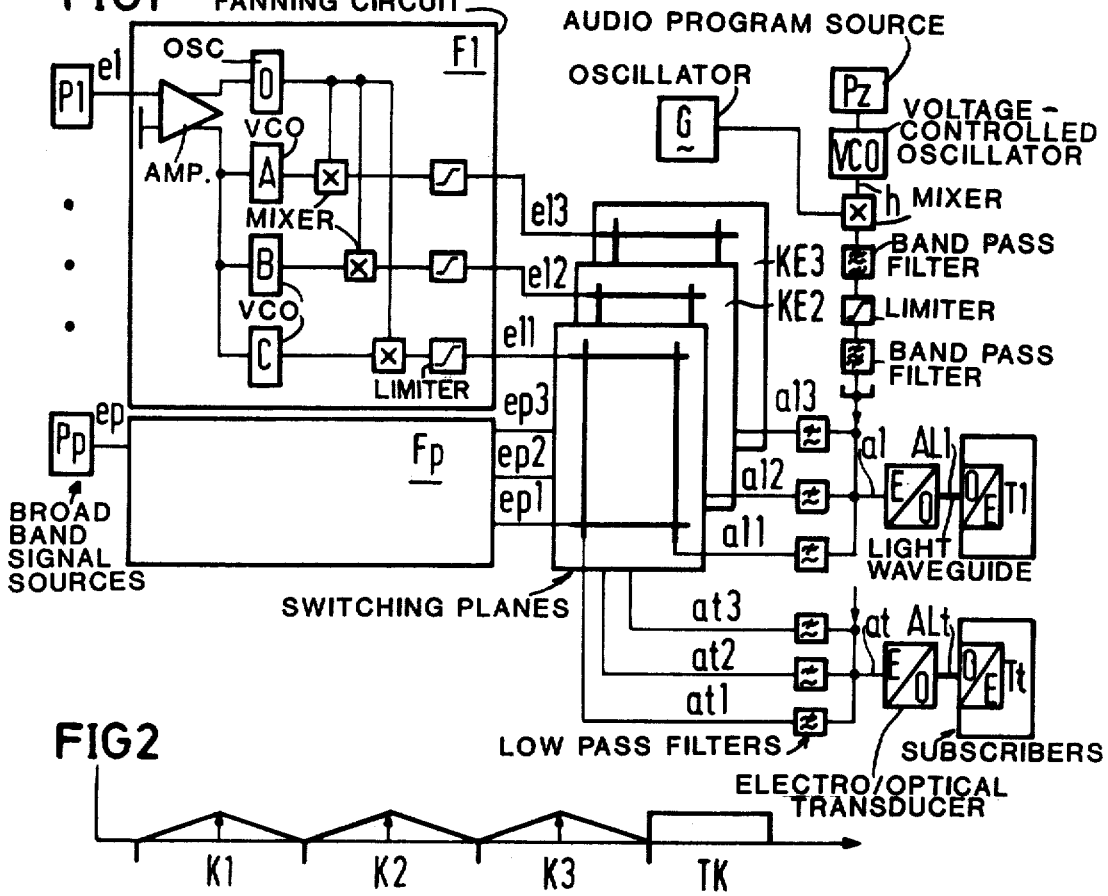
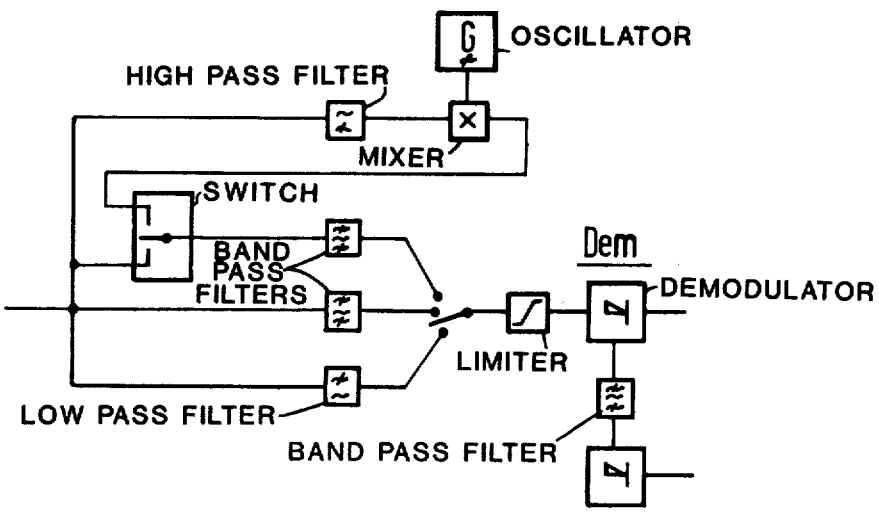

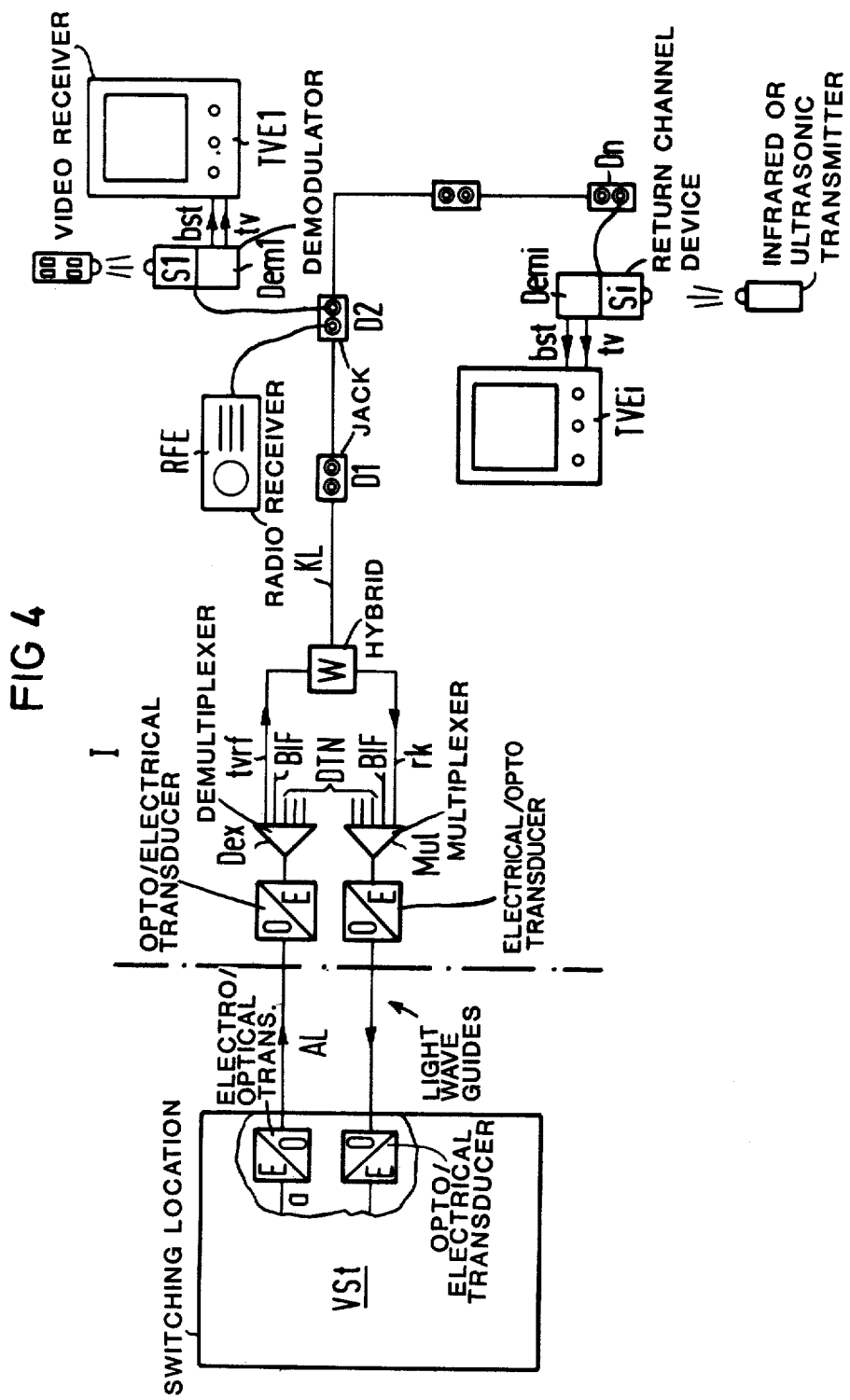

BROAD BAND SWITCHING SYSTEM

BACKGROUND OF THE INVENTION

1. Field of the Invention

This invention relates to a broad band switching system for the selective connection of broad band signal sources to subscribers receiving broad band signals by way of a broad band switching network in which the cross point circuits, whose function is to selectively connect input lines to output lines of the switching network in view of signals to be through-connected, the signals having signal frequencies of, for example, up to more than 100 MHz and being angle modulated with broad band signals, can be formed by means of linkage elements realized in emitter-coupled logic (ECL) technology.

2. Description of the Prior Art

The ECL technology mentioned above is disclosed in German allowed and published application 2,828,662 and is generally set forth in Pfannschmidt: "Arbeitsgeschwindigkeitsgrenzen von Koppelnetzwerken für Breitband-Digitalsignale", Dissertation, Technical University Braunschweig, 1978.

Given a broad band switching network of the type generally set forth above, television programs can be switched, for example, to subscribers who wish to receive the same, as is involved in recent developments of telecommunications which lead to broad band communication networks having subscriber lines formed with light wave guides, whereby a star network of light wave guides having one light wave guide per dwelling unit proves favorable at the subscriber level, the light wave guide connecting a broad band switching location (advantageously spatially united with the nearest telephone switching location) to the dwelling of the subscriber and by way of which all telecommunication services for the appertaining dwelling unit are sequenced, whereby offering, for example, at least approximately the following communication possibilities comes into consideration for a dwelling unit, which does justice to future developments:

three video channels for three video receivers having independent access to all television signal sources which can be reached by the switching location or, respectively, television programs which are available in the switching location; and three return channels for program selection and, under certain conditions, for sequencing interactive services, as well as a greater number of very high frequency (VHF) radio channels (stereo, NTZ 32 (1979) 3, pp. 150–153 and Antennen Information No. 63, June 1979, pp. 3–5.

In such TV program switching, it does not suffice that a multitude of subscriber terminals can be simultaneously connected to one and the same program source but, rather, vice-versa, one and the same subscriber terminal must also be able to simultaneously be connected to a plurality of program sources. To this end, it is known to provide subscriber-specific frequency multiplexers at the broad band switching center and to provide a frequency demultiplexer at each subscriber and to transmit the greatest programs in frequency division multiplex by way of a light wave guide. (Antennen Information No. 63, June 1979, pp. 3–5). This requires a corresponding multiplex expense and the present invention provides a technique for reducing such expense.

SUMMARY OF THE INVENTION

The present invention relates to a broad band switching system for the selective connected of broad band signal sources, particularly TV program sources, to subscribers receiving broad band signals via a broad band switching network by way of which signals angle modulated with the broad band signals, particularly TV signals, are transmitted, according to which a number of such signals can be transmitted in frequency division multiplex to the subscriber by way of a light wave guide. Such a broad band switching system is particularly characterized, according to the present invention, in that the angle modulated signals of the individual signal sources are supplied to signal source specific inputs in frequency channel-specific switching levels of the broad band switching system in a plurality of frequency channels, the plurality of channels corresponding to the number of signal sources which are simultaneously connectible to one and the same subscriber, of a frequency division multiplex system encompassing at least these frequency channels and, in the broad band switching network, the outputs from the frequency channel-specific switching levels, the outputs being respectively subscriber-specific interconnected to the light wave guide extending to the subscriber, are respectively connected in subscriber-specific determined frequency channels of the plurality of frequency channels to the respectively desired signal source.

Practicing the present invention, proceeding from a plurality of subscribers exceeding the plurality of available TV program sources by a multiple, offers the advantage of a significant reduction of the required frequency division multiplex expense.

The above expense can be further limited in that, in a further development of the invention, a respective fanning circuit having n frequency converters is charged at the input side by the appertaining broad band signal source with its broad band signal and is preconnected to n signal source-specific inputs in n frequency channel-specific switching levels of the broad band switching network. The fanning circuit is formed by n oscillators, voltage-controlled in anti-phase to a $(n+1)^{th}$ voltage-controlled oscillator, the oscillators being charged with the broad band signal and, respectively together with the $(n+1)^{th}$ oscillator, feeding a mixer. This avoids the expense of a respectively separate balanced modulator given linearity of the respective modulation characteristic which is nonetheless good.

In a further development of the invention, additional broad band signal sources, particularly TV program sources, can be constantly connected to the light wave guide extending to the subscriber in additional frequency channels of the frequency division multiplex system. This makes possible an additional exploitation of portions which are still free in the frequency division multiplex system provided in the broad band switching system. Alternatively, or additionally thereto, in a further development of the invention, more narrow banded signal sources, particularly audio program sources, can be constantly connected to the light wave guide extending to the subscriber in additional more narrow banded frequency channels of the frequency division multiplex system. In this manner, also, additional portions which are still free in the frequency division multiplex system provided in the broad band switching system can also be exploited. Thereby, it is advantageous in a further development of the invention to post-connect a respective frequency deviation boosting circuit to the audio program sources, the boosting circuit making the frequency deviation approximately 1-2 magnitudes greater than the maximum modulation frequency. Given a desired signal-to-noise (S/N) ratio, this makes it possible to connect a relatively large number of audio program sources to the light wave guide extending to the subscriber.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of an embodiment of a broad band switching system constructed in accordance with the present invention;

FIG. 2 illustrates the position of frequency channels in a frequency division multiplex system;

FIG. 3 is a schematic representation of specific technical features of the apparatus of FIG. 1; and FIG. 4 is a schematic representation of an embodiment of a subscriber dwelling terminal which may be employed in practicing the present invention.

DESCRIPTION OF THE PREFERRED EMBODIMENTS

Referring to FIG. 1, the circuit disclosed is similar to that set forth in my U.S. patent application Ser. No. 204,208 filed Nov. 5, 1980, with further details which may be of interest within the framework of the present invention. A broad band switching system having a broad band switching network is schematically illustrated in a scope necessary for an understanding of the invention, by way of which broad band switching system broad band signal sources P1-Pp which, in particular, may be provided by means of television program sources, can be connected to a plurality of subscribers T1-Tt receiving broad band signals. It is assumed that the subscribers, for example, respectively form a dwelling terminal, to/from which a plurality of communication possibilities may be provided in the manner mentioned above. Signals which are angle modulated with the broad band signals, preferably provided by TV signals, are transmitted via the broad band switching network, according to which a respective plurality of such signals can be transmitted in frequency division multiplex by way of a light wave guide AL1-ALt to the subscribers T1-Tt.

By way of corresponding modulation systems F1-Fp, the individual broad band signal sources P1-Pp are connected to signal source-specific inputs e11, e12, e13, etc. and ep1, ep2, ep3, etc. of the broad band switching network to whose subscriber specific outputs a11, a12, a13, etc. and at1, at2, at3, etc the subscribers t1-tt are connected. The individual input lines e11, e12, e13 and ep1, ep2, ep3 can be connected to the output lines a11, a12, a13 and at1, at2, at3 by way of cross points which are not illustrated in detail on the drawing. The cross point switches can be formed in a known manner (for example as disclosed in the German allowed and published application 2,828,662) by means of linkage elements preferably realized in ECL technology, for example, by AND circuits of, for example, the type 10 104 and/or by NOR element circuits of, for example, the type 10 102. They also be respectively monolithically integrated in a plurality on a chip.

By way of the broad band switching network, the subscriber-specific outputs are respectively connected to a respectively desired signal source-specific input of the broad band switching network in frequency channels of a frequency division multiplex system which have been determined individually with respect to subscribers (preferably by way of subscriber return channels as were initially mentioned). To this end, FIG. 2 illustrates the position of the frequency bands of such frequency channels in a frequency division multiplex system. Such frequency channels are referenced K1, K2, K3, while the reference TK indicates a further range in which narrow band frequency channels can be accommodated, as shall be explained in greater detail below. The three broad band channels K1, K2, K3, for example, can have mean frequencies of approximately 20, 48, 78 MHz given channel widths of approximately 28 MHz. The range TK could, for example, extend over approximately 20-110 MHz and, for example, contain 20 channels having channel widths of approximately 1 MHz.

A subscriber T1-Tt can be connected by way of the cross point switches coming into consideration to the individual signal source-specific inputs e11, e12, e13; ep1, ep2, ep3 (or, respectively, e1-ep) of the broad band switching network in the individual frequency channels K determined according to the measure of the respective receiver of a plurality of receivers provided at the respective subscriber T1-Tt, whereby a subscriber, under certain conditions, can also be connected in a plurality of frequency channels to one and the same broad band signal source P1-Pp.

To this end, the broad band switching network has frequency channel-specific switching planes KE1, KE2, KE3 and the angle modulated signals extending from the individual broad band signal sources P1-Pp are supplied to the signal-specific inputs e11, e12, e13; ep1, ep2, ep3 of the individual frequency channel-specific switching planes KE1-KE3 of the broad band switching network in a plurality of frequency channels K1-K3 (FIG. 2) of the frequency division multiplex system comprising at least these frequency channels, the plurality corresponding to the number of signal sources P1-Pp which can be simultaneously connected to one and the same subscriber T1-Tt. Thereby, in the example according to FIG. 1, three frequency channel-specific switching planes KE1, KE2, KE3, corresponding to the frequency channels K1, K2, K3 (FIG. 2), are provided. A respective fanning circuit F1-Fp which is fed at its input side with the broad band signal of the appertaining broad band signal source P1-Pp is pre-connected to the respectively three or, respectively, stated in more general terms, n signal source specific inputs e11, e12, e13; ep1, ep2, ep3 in the n (=3) frequency channel-specific switching planes KE1, KE2, KE3 of the broad band switching network. In the example illustrated, the fanning circuit F1 comprises n=3 frequency converters (frequency modulators) which are formed by n voltage controlled oscillators A, B, C which are fed with the broad band signal in anti-phase to a $(n+1)^{th}$ voltage-controlled oscillator, the first-mentioned oscillators respectively together with the $(n+1)^{th}$ oscillator O feeding a mixer, for example, a Siemens mixer S 042. Given an oscillator frequency already corresponding to the carrier frequency, the mixer, if desired, can be eliminated. As indicated in FIG. 1, a limiter can be respectively post-connected to the individual mixers. The remaining fanning circuits, up to the fanning circuit Fp, can be designed in an analogous manner.

With the assistance of the fanning circuits F1-Fp, it is guaranteed that each broad band signal emitted by a signal source P1-Pp is available in each of the frequency channels K1, K2, K3 at a respective signal source-specific input e11, e12, e13; ep1, ep2, ep3 of the broad band switching network and, accordingly, can be switched by way of the cross point switches respectively coming into consideration to the individual subscriber-specific outputs a11, a12, a13; at1, at2, at3 and, further, can be transmitted in frequency division multiplex to the individual subscribers T1-Tt by way of the light wave guide (AL) extending to the respective subscriber (T).

In the exemplary embodiment illustrated in FIG. 1, filters suppressing harmonics which are respectively subscriber-specifically interconnected on the output side of the switching network are post-connected to the subscriber-specific outputs.

As shall be further seen from FIG. 1, further, narrow band signal sources, particularly audio program sources, can be connected to the subscriber-specific output lines a1-at, so that such audio program sources, such as the program source Pz illustrated in FIG. 1, can be constantly connected to the light wave guides extending to the respective subscribers in additional, more narrow band frequency channels of the frequency division multiplex system (cf. FIG. 2). In an analogous manner, additional broad band signal circuits, particularly TV program sources, can likewise be constantly connected to the light wave guides AL1-ALt extending to the subscriber T1-Tt in additional frequency channels of the frequency division multiplex system. In the embodiment illustrated in FIG. 1, thereby, a frequency deviation boosting circuit which may make the frequency deviation greater than the maximum modulation frequency by approximately 1-2 magnitudes is post-connected to a voltage-controlled oscillator VCO modulated in frequency by the audio program source Pz (or, respectively, to a receiver which receives the program transmitted, but not yet demodulated from a VHF radio transmitter). To this end, as can also be seen in FIG. 1, the signal which is frequency-modulated with the audio program appearing on a line h can be converted in a known manner to an intermediate frequency which may lie, for example, at approximately 10 MHz, whereupon the converted signal is limited so that one receives a signal which is very rich in harmonics. From this, a harmonic is relayed by a band pass filter, the frequency of the harmonic being approximately 1-2 magnitudes greater than the intermediate frequency and its frequency deviation, therefore, likewise being greater than previously by approximately 1-2 magnitudes (powers of ten). This results in the fact that, on the receiving side, a high S/N ratio is already achieved with the modulation of the electro-optical transducer E/O with an audio signal level which is still low and which renders possible a simultaneous feeding of the electro-optical transducer E/O with a correspondingly great number of further audio program signals.

At the subscriber of a broad band communication network such as was initially mentioned, the signals which have arrived at the respective subscriber T by way of the respective light wave guide AL1-ALt can, after conversion in an opto-electrical transducer O/E, be transmitted to the respective receiver on a coaxial line which is provided on a per dwelling basis. Such coaxial line may be employed in common for video and radio signals and lead to one or more connection jackets, as is basically shown in FIG. 4. Thereby, a conversion circuit such as illustrated in FIG. 3 is to be provided at the receiver, if need be for matching to conventional reception devices. By use of corresponding filters, such a conversion circuit can respectively filter one of the three (as per the example) channels K1, K2, K3 (FIG. 2) out and supply the broad band signal transmitted therein to a demodulator Dem from whose output the signals can be supplied, upon separation of video and audio signals, to a monitor input of a video receiver. Given television sets which do not have a monitor input, the video signals can also be converted into the VHF position and be supplied in an appropriate form to a high frequency (HF) input of the receiver.

Broad band signals transmitted in additional frequency channels of the frequency division multiplex system according to FIG. 2 at, for example, mean frequencies of approximately 124, 152, 180, 208 and 236 MHz can be filtered out in the conversion unit according to FIG. 3 by a corresponding high pass filter and be subsequently converted by an intermediate frequency converter into, for example, a frequency position corresponding to the frequency channel K3 (FIG. 3) and can then be supplied instead of the broad band signal transmitted in the frequency channel K3 to the demodulator Dem by way of the filter belonging to this channel.

In FIG. 4, details at the subscriber side of a broad band telecommunication system are illustrated, the broad band telecommunication system having a switching location VSt as is illustrated in FIG. 1, and to which a subscriber T is individually connected by way of one (or, respectively, two) light wave guides AL. On such a light wave guide AL, let, as described above, a respective plurality of video channels and radio channels and, under certain conditions, of additional (for example, 64 kbit/s) unit (standard) channels of an integrated digital communication network be combined in multiplex. To this end, it is indicated in FIG. 4 that the subscriber-specific light wave guide AL is connected in the switching location VSt to an electro-optical (or, respectively, opto-electrical) transducer E/O, as is illustrated in FIG. 1. On the subscriber side, an opto-electrical (or, respectively, electro-optical) transducer O/E is connected to the light wave guide AL, as is likewise illustrated in FIG. 1. A demultiplexer Dex is post-connected to the opto-electrical transducer O/E. Digital signals are transmitted on the light wave guide AL in 64 kbit/s unit channels (in the example) of an integrated digital telecommunication system are occurring at the outputs DTN of the demultiplexer Dex separately from the video and radio signals appearing at the output line tvrf. Telephone television signals, under certain conditions, occur at the output BIF. In the opposite transmission direction, a multiplexer Mul is preconnected to the (electro-optical transducer O/E, the multiplexer Mul combining, say, digital signals occurring at inputs DTN to be transmitted in 64 kbit/s unit channels of the integrated digital telecommunication network and television telephone signals occurring under certain conditions at an input BIF with return channel signals occurring on an input line rk.

It should be pointed out here that two light wave guides connecting the switching location VSt and the subscriber T to one another are illustrated in FIG. 4 but that, particularly when avoiding a broad band return channel as is required in two-way cable television, the light wave guide extending from the switching location VSt to the subscriber T can fundamentally be co-employed in the reverse transmission direction for the return channels as well.

The output line tvrf of the demultiplexer Dex carrying the video and radio signals leads via a separating filter (hybrid) W to a subscriber or, respectively, dwelling-specific coaxial line KL to be employed in common for video and radio signals, to which jacks D1–Dn having separate receptacles for video and radio signals are connected. Thereby, the coaxial line can be formed by a coaxial line of an antenna system which already exists in the appertaining dwelling unit, as may particularly be the case in single-family houses. The light wave guide AL then advantageously terminates at the subscriber T at a location were a connection to the existing antenna system can be produced without great expense. Radio receivers and video receivers can be connected in any desired distribution to the jacks D1–Dn of the coaxial line KL.

To this end, it is shown in FIG. 4 of the drawing that a radio receiver RFE is connected to the radio receptacle of the jack D2. The radio signals are advantageously transmitted in VHF frequency position with the standard stereo technology by way of the light wave guide AL and the coaxial line KL. If transmission in this form by way of the light wave guide is not possible, then, advantageously directly behind the opto-electronic transducer O/E, a suitable receiver conversion into the VHF position is provided and the radio signal is forwarded in this form to the coaxial line KL. Any VHF receiver can then be directly connected to the receptacle, whereby a corresponding VHF band pass filter can be provided after or, better, in the radio receptacle for reducing a disruptive influence due to video signals.

It is further shown in FIG. 4 that a video receiver TVE1 is connected to the video receptacle of the jack D2 and that a video receiver TVEi is connected in an analogous manner to the jack Dn. The video signals intended for the video receivers TVE1, TVEi are supplied by way of the broad band switching network according to FIG. 1 to the electro-optical transducer E/O on the output side, so that the video signals are transmitted on the light wave guide AL, on the output line tvrf of the demultiplexer Dex, and on the dwelling coaxial line KL in transmission channels which are assigned to the individual video receivers TVE1, TVEi now being operated at the coaxial line KL. Thereby, the video signals intended for a video receiver operated at any given jack of the coaxial line, for example, for the video receiver TVE1, operated at the jack D2, arrive from the appertaining jack to a receiver-specific, permanently adjusted channel filter demodulator, the demodulator Dem1 belonging to the video receiver TVE1 in the example, from whose output tv, upon separation of video and audio, the signals can be supplied to the monitor input of the video receiver TVE1. In an analogous manner, the video signals in the broad band telecommunications system illustrated on the drawing and intended for the video receiver TVEi now being operated at the jack Dn can arrive from the jack Dn to a channel filter demodulator Demi belonging to the video receiver TVEi, proceeding from which channel filter demodulator Demi the signals are supplied to the monitor input of the video receiver TVEi. Given television sets which do not have a monitor input, the video signals can also be converted into the VHF position and be supplied in a suitably converted form to a HF input of the receiver.

Since the video transmission channels are receiver-specific, one can also selectively transmit picture screen text (interactive videotex, Green Thumb) signals via such a channel. Such picture screen text signals are recognized in the demodulator Dem and are coupled out by way of a separate output bst, proceeding from which they can be supplied to a picture screen text decoder belonging to the video receiver TVE.

The determination as to which video signals a video receiver wishes to receive now can be undertaken proceeding from the appertaining video receiver via its return channel with the assistance of return channel devices S1, Si belonging to the video receivers TVE1, TVEi. To this end, it is indicated on the drawing that infrared or ultrasonic signals can be supplied in a wireless manner, for example, by a remote control device, to the return channel devices S1, Si, the signals then be respectively converted into digital signal words of, for example, 8 bits in the return channel devices (not illustrated in detail on the drawing) in order to then be likewise transmitted on the coaxial line KL in the return channels assigned to the individual video receivers TVE (or, respectively, their return channel devices) operated at the coaxial line KL.

To that end, an encoded character to be transmitted can first be intermediately stored in the return channel device (for example, S1) and thereby trigger a transmission cycle at all return channel devices (S1, Si) of the subscriber T and in the switching location VSt, in which transmission cycle the character and, under certain conditions, characters occurring at the proper time at another return channel device (Si) of the subscriber are transmitted in time slots of the transmission cycle assigned to the return channel devices S1–Si to the switching location VSt by way of the coaxial line KL and the light wave guide AL. Alternatively to such a chronological separation of the return channels from one another, the return channels (separated in frequency position from the transmission channels assigned to the video receivers TVE in the forward direction) can, however, also be separated from one another in their frequency positions. This, however, need not be considered in further detail here, since the same is not necessary for an understanding of the invention and is well within the skill of those versed in the art.

The return channel signals transmitted on the coaxial line KL are separated from the video and audio frequency signals and transmitted in the forward direction in the separating filter W and are supplied by way of the multiplexer Mul to the electro-optical transducer O/E for the return direction. As indicated in FIG. 4 of the drawing, the optical signals can then be transmitted by way of a separate light wave guide or, deviating from that illustrated, in wave length division multiplex on the same light wave guide AL as the forward signals.

Instead of supplying, as explained above, the return signal which has an upper frequency limit of a magnitude of 100 KHz proceeding from the respective return channel device S1, Si via a separating filter to the same connection cable and, therefore, also to the coaxial line KL by way of which the forward signal is also transmitted, the control signals proceeding from the receiver-specific return channel devices S1–Si can also be transmitted on receiver-specific, preferably symmetrical lines to the multiplexer Mul pre-connected to the electro-optical transducer O/E for the return direction, or at least to a separate multiplex line provided next to the coaxial line KL and in turn leading to the multiplexer Mul.

It should be pointed out here that, deviating from the conditions illustrated on the drawing, a number of coaxial lines can be connected in parallel to an opto-electric transducer O/E on the subscriber side as is illustrated on the drawing, whereby, under certain conditions, only one jack can be connected to such a coaxial line.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A broad band switching system for the selective connection of broad band signals to a plurality of subscribers, comprising:
    a plurality of broad band signal sources, each operable to produce respective angle-modulated signals;
    a plurality of fanning circuits, each connected to a respective source and including a plurality of outputs and operable to provide the modulated signals at respective outputs on respective frequency channels;
    a broad band switching network including a plurality of switching planes each assigned a frequency position and each including inputs connected to those outputs of said fanning circuits assigned to the same frequency position, and a plurality of outputs each assigned to a respective subscriber; and
    a plurality of light transmission circuits each connected to all of the outputs of said switching network assigned to a respective subscriber.

2. The broad band switching system of claim 1, wherein each of said fanning circuits comprises:
    n mixers each connected to receive a signal representative of the signal of the respective broad band source and connected to a respective fanning circuit output;
    n voltage-controlled oscillators, each connected between the respective broad band source and a respective mixer; and
    an additional-voltage controlled oscillator connected to each mixer and operable to feed the mixers antiphase with respect to said n voltage-controlled oscillators.

3. The broad band switching system of claim 2, wherein:
    n is equal to three.

4. The broad band switching system of claim 3, wherein:
    the three channels are channels in the VHF band.

5. The broad band switching system of claim 1, and further comprising:
    a plurality of filters each connecting a respective output of said switching network to the assigned light transmission circuit for suppressing harmonics.

6. The broad band switching system of claim 1, and further comprising:
    at least one narrow band source connected to at least one light transmission circuit.

7. The broad band switching system of claim 6, wherein:
    said narrow band source includes means operable in the VHF radio band.

8. The broad band switching system of claim 6, wherein said narrow band source comprises:
    frequency deviation boosting means for increasing the frequency deviation to above the maximum modulation frequency by a range of approximately 1-2 magnitudes.

9. The broad band switching system of claim 6, and further comprising:
    a subscriber station connected to one of said light transmission circuits and comprising means for converting signals received in frequency channels above the VHF radio band into a frequency channel of the VHF band.

10. A broad band switching system of the selective connection of broad band signals to a plurality of subscribers, comprising:
    a plurality of subscriber terminals;
    a plurality of broad band signal sources, each operable to produce respective angle-modulated signals;
    a plurality of fanning circuits, each connected to a respective source and including a plurality of outputs and operable to provide the modulated signals at respective outputs on respective frequency channels;
    a broad band switching network including a plurality of switching planes each assigned a frequency position and each including inputs connected to those outputs of said fanning circuits assigned to the same frequency position, and a plurality of outputs each assigned to a respective subscriber; and
    a plurality of light transmission circuits each connected at one end to all the outputs of said switching network assigned to a respective subscriber and at the other end to a respective subscriber terminal,
    each of said light transmission circuits comprising an electro-optical transducer connected to the respective outputs of said switching network, an opto-electrical transducer in the respective subscriber terminal, and a light wave guide connecting said transducers.

* * * * *